United States Patent [19]
Irvine

[11] 3,782,130
[45] Jan. 1, 1974

[54] APPARATUS FOR PROVIDING AN INDICATION OF THE IMMINENCE OF ICE-FORMATION

[75] Inventor: John Anderson Irvine, Penicuik, Scotland

[73] Assignee: Findlay, Irvine Limited, Penicuik, Midlothian, Scotland

[22] Filed: May 9, 1972

[21] Appl. No.: 251,816

[30] Foreign Application Priority Data
May 20, 1971 Great Britain............... 16109/71

[52] U.S. Cl......................... 62/128, 62/140, 73/336
[51] Int. Cl............................................. F25d 21/02
[58] Field of Search...................... 62/139, 140, 161, 62/128, 129, 130; 340/234; 73/336

[56] References Cited
UNITED STATES PATENTS
3,164,820  1/1965  Hulett................................. 62/128
3,408,477  10/1968  Kolski................................. 62/140
3,434,347  3/1969  Lockwood........................... 73/336

Primary Examiner—Meyer Perlin
Attorney—Solon B. Kemon et al.

[57] ABSTRACT

A refrigerator is arranged to cool part of an area for which an indication of the imminence of ice-formation is required. A first temperature sensitive circuit and a first conductivity probe are situated in that part of the area while a second temperature sensitive circuit and a second conductivity probe are situated outside it. A first differential amplifier compares the conductivities of the conductivity probes and a second differential amplifier compares the outputs of the temperature sensitive circuits. The outputs of one of the differential amplifiers controls the refrigerator while the output of the other differential amplifier provides the said indication.

10 Claims, 2 Drawing Figures

APPARATUS FOR PROVIDING AN INDICATION OF THE IMMINENCE OF ICE-FORMATION

The invention is concerned with apparatus for indicating that a solution is near to its freezing temperature. Apparatus for providing such an indication is described in our British Pat. Nos. 1,185,827 and 1,228,889. The present invention is particularly, but not exclusively, intended for use on airfield runways and other surfaces that are sprayed with chemicals such as UREA or KONSIN to depress the freezing temperature of surface water.

Such chemicals, while depressing the freezing temperature of water by an amount related to their concentration, do not significantly alter its conductivity as does, for instance, salt. There is thus no simple way of obtaining a reading of the actual surface concentration of such chemicals and so it is normal practice for airfields to be sprayed repeatedly with sufficient chemical to ensure the maximum possible depression of the freezing temperature. Such a practice, although laudable from a safety point of view, entails considerable expenditure and can be detrimental to the environment.

The present invention provides apparatus for providing an indication of the imminence of ice-formation, including first and second conductivity probes respectively connected to complementary inputs of a first differential amplifier, first and second temperature sensitive circuits respectively connected to complementary inputs of a second differential amplifier and a refrigerator connected to the output of one of the differential amplifiers and associated with the first conductivity probe and the first temperature sensitive circuit, the arrangement being such that in operation the refrigerator cools the first conductivity probe and the first temperature sensitive circuit and is controlled by the output of the said one differential amplifier while the output of the other differential amplifier provides the said indication of imminence of ice-formation.

Thus in one aspect the present invention provides apparatus for providing an indication of the imminence of ice-formation, including first and second conductivity probes respectively connected to compelementary inputs of a first differential amplifier, first and second temperature sensitive circuits respectively connected to complementary inputs of a second differential amplifier and a refrigerator connected to the output of the second differential amplifier and associated with the first conductivity probe and the first temperature sensitive circuit, the arrangement being such that in operation the refrigerator cools the first conductivity probe and the first temperature sensitive circuit and is controlled by the output of the second differential amplifier to maintain the first conductivity probe and the first temperature sensitive circuit at a predetermined temperature below the temperature of the second temperature sensitive circuit while the output of the first differential amplifier provides the said indication of imminence of ice-formation. In this aspect the output of the first differential amplifier, indicates that ice-formation is imminent when the conductivity of the second probe is high, indicating the presence of water, and the conductivity of the first probe is low, indicating that water has frozen at the said predetermined temperature below that of the second temperature sensitive circuit.

In another aspect the present invention provides apparatus for providing an indication of the imminence of ice-formation, including first and second conductivity probes respectively connected to complementary inputs of a first differential amplifier, first and second temperature sensitive circuits respectively connected to complementary inputs of a second differential amplifier and a refrigerator connected to the output of the first differential amplifier, and associated with the first conductivity probe and the first temperature sensitive circuit, the arrangement being such that in operation the refrigerator cools the first conductivity probe and the first temperature sensitive circuit and is controlled by the output of the first differential amplifier to maintain the first conductivity probe and the first temperature sensitive circuit at the freezing point of a solution in which they are immersed while the output of the second differential amplifier provides the said indication of the imminence of ice-formation. In this aspect the output of the second differential amplifier can indicate, for example, how many degrees a surface ambient temperature is above the freezing point of the solution on the surface.

The invention is preferably provided with an override circuit so that it does not function except when the ambient surface temperature drops below a predetermined absolute value.

Embodiments of the invention will now be described in detail with reference to the drawings accompanying the provisional specification, in which.

Figure 1:
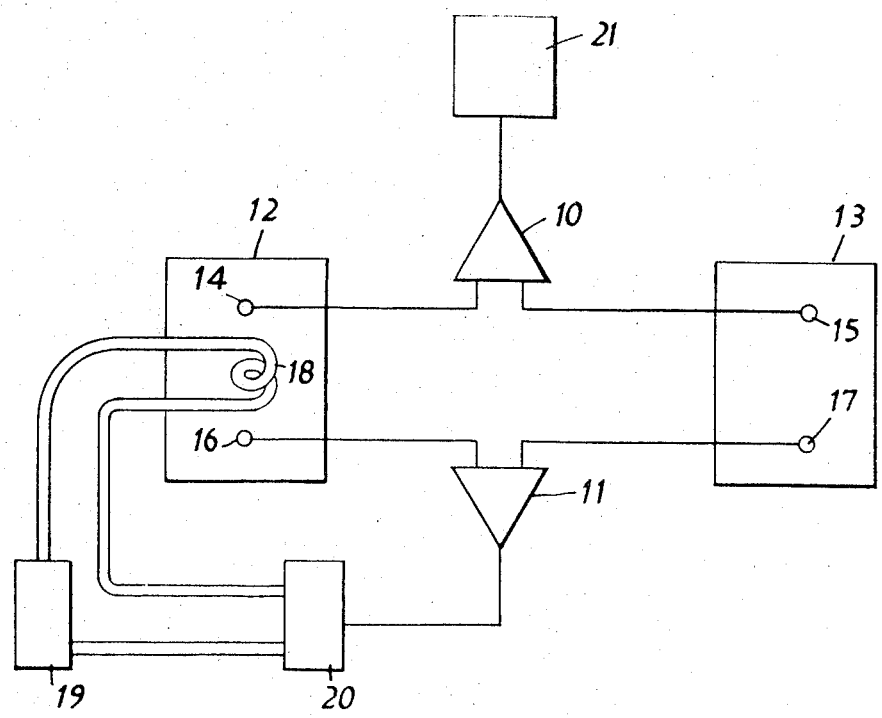
FIG. 1 is a block diagram of apparatus according to the invention.

In the block diagram, FIG. 1, two differential amplifiers 10 and 11 have their respective complementary inputs connected to devices in two separate areas of runway 12 and 13. A refrigerator 19 is connected to a circulating pump 20 and a heat exchanger 18 by tubing carrying refrigerant such as glycol. The heat exchanger 18 cools the area 12 of runway, when refrigerant is being pumped through the tubing by the pump 20. The pump 20 is controlled by the output of the differential amplifier 11 while the output of the differential amplifier 10 is connected to a display device 21.

In a first aspect of the invention the circles 14 and 15 represent respectively first and second conductivity probes and the differential amplifier 10 represents the first differential amplifier while the circles 16 and 17 represent respectively first and second temperature sensitive circuits and the differential amplifier 11 represents the second differential amplifier. In this aspect the differential amplifier 11 is biased to produce a "no-difference" output when the temperature sensitive circuit 16 is at a predetermined temperature below the temperature of the temperature sensitive circuit 17. It is arranged in known manner to have positive feedback so that the output changes very sharply from hard off to hard on and vice versa as the temperature difference between the circuits 16 and 17 fluctuates through the predetermined temperature difference. The output is arranged to turn the pump 20 on when the circuit 16 is warmer and off when it is cooler than the predetermined temperature with respect to the circuit 17, thus maintaining the area of runway 12 at the predetermined temperature below the area of runway 13. The predetermined temperature may typically be in the region of 2° to 5° C. As the ambient temperature of the area runway 13 fluctuates, the area 12 fluctuating at a constant predetermined temperature below the temperature of the area 13, will reach the freezing temperature of the solution on the runway before the area 13 reaches that temperatue. The conductivity of frozen solution is many times less than the conductivity of the liquid solution and so the differential amplifier 10 connected to the conductivity probes 14 and 15 provides a large change in output as the solution around the probe 14 freezes. This change in output causes a display device 21 to change from a "safe" indication to a "danger" indication. The display device 21 may consist simply of two lights but other arrangements are possible according to the requirements of the user. It is also possible, to use the output indication of the differential amplifier 10 to control directly some corrective action such as the turning on of a runway heating system or the turning on of a chemical spraying system.

Using this aspect a certain amount of chemical can be sprayed on the runway when the "danger" warning is given. On many occasions the amount sprayed on the runway will be sufficient to enable safe aeroplane movements for a considerable length of time but should the temperature fall still further thus requiring a greater concentration of chemical for safe operation or should there be rainfall, diluting the solution on the runway the apparatus will give warning in time for more chemical to be sprayed on.

In a second aspect of the invention the circles 14 and 15 represent respectively first and second temperature sensitive circuits and the differential amplifier 10 represents the second differential amplifier while the circles 16 and 17 represent respectively first and second conductivity probes and the differential amplifier 11 represents the first differential amplifier. In this aspect the differential amplifier 11 is arranged to turn on the pump 20 until the conductivity of the probe 16 becomes lower than the conductivity of the probe 17, it then turns the pump off until the conductivities move nearer to each other. In other words the differential amplifier 11 controls the refrigerator so that the area of runway 12 is maintained at the freezing point of the solution on the runway.

The differential amplifier 10 connected to the temperature sensitive circuits 14 and 15 provides an output proportional to the temperature difference between the areas of runway 12 and 13. This output can conveniently be displayed by the control device 21 using a scale calibrated in numbers of degrees or by using a scale calibrated in given units of weight of chemical needed per unit area of runway. In the latter case the display device may contain further comparison circuits so that the indicated quantity of chemical takes into account both the temperature above its freezing point of the solution and its absolute ambient temperature. It is, of course, possible to provide a simple "safe"/"danger" output as in the first aspect if preferred.

It is convenient to provide an over-ride circuit to inhibit the operation of the apparatus when the ambient temperature is above some value such as 5° C. In order to avoid wastage of power to the refrigerator when the runway is dry or when it is frozen over, the second aspect of the invention requires an over-ride so that it only functions when the conductivity of the second (uncooled) conductivity probe is high.

In order to keep a "danger" warning alight when using the first aspect of the invention and when the runway is frozen over, a third, heated, conductivity probe can be wired in parallel with the second conductivity probe. The third probe should be mounted out of thermal contact with the temperature sensitive circuit and should provide a high conductivity signal so long as there is water or ice present.

Figure 2:
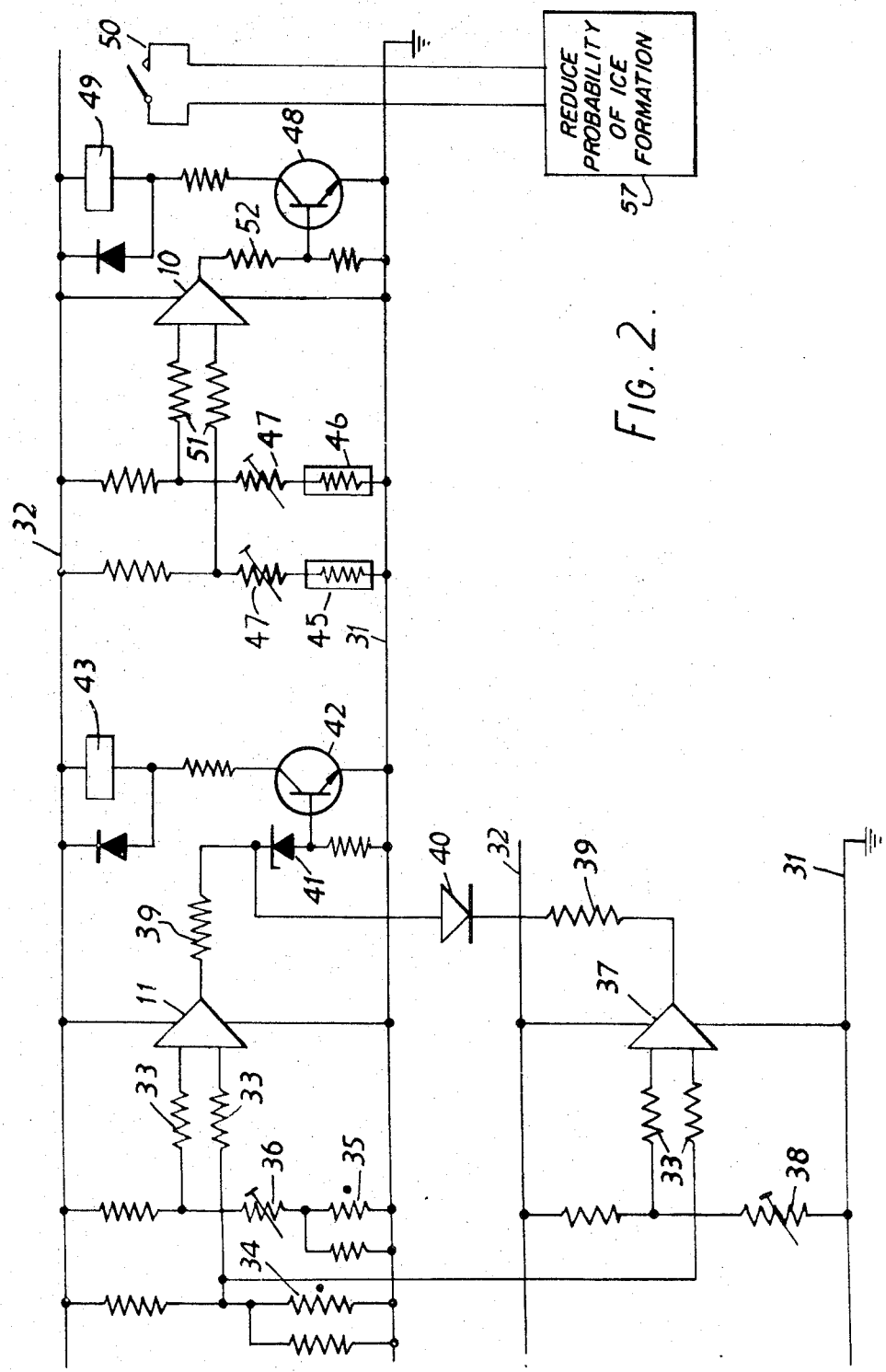
FIG. 2 is a circuit diagram of one embodiment of the invention.

The circuit diagram of FIG. 2 shows, in greater detail, the working of an embodiment of the first aspect of the invention. The circuit includes an earth supply rail 31 and a positive supply rail 32. The differential amplifier 11 is connected via resistors 33 to intemediate points of two potential dividing chains across the supply. One of the chains comprises the first temperature sensitive circuit and includes a thermistor 35 and a pre-set potentiometer 36 while the other chain comprises the second temperature sensitive circuit and includes a thermistor 34. The output of the second temperature sensitive circuit is also connected, via another resistor 33 to one input of a differential amplifier 37 which has its complementary input connected via a resistor 33 to a reference potential determined by the setting of a pre-set potentiometer 38.

The setting of the pre-set potentiometer 36 sets the predetermined temperature difference (2° C for example) at which the differential amplifier 11 provides a "no-difference" output and the setting of the pre-set potentiometer 38 sets the temperature (5° C for example) at which the output of the differential amplifier 37 over-rides the output of the differential amplifier 11. The outputs of both the differential amplifiers 11 and 37 are fed via resistors 39 and an AND gate comprising a diode 40 and a zener diode 41 to the base of a transistor 42. It can be seen that in operation when the output of the differential amplifier 37 goes low the base of the transistor 42 is held low regardless of the value of the output of the differential amplifier 11, but that when the output of the differential amplifier 37 goes high the base of the transistor 42 follows the output of the differential amplifier 11. The transistor 42 has a relay 43 connected in its collector circuit which, in operation, is energized when the outputs of both the differential amplifiers 11 and 37 are high. It is arranged that the relay 43 is energized when the temperature difference is less than 2° C and the surface ambient temperature is less than 5° C. When the relay 43 is energized its contacts close to turn on the refrigerant pump 20.

The differential amplifier 10 is connected via resistors 51 to intermediate points of two further potential dividing chains across the supply. One of the chains includes the first conductivity probe 45 and the other chain includes the second conductivity probe 46. Both chains include a preset potentiometer 47 for initial setting up of the apparatus. The output of the differential amplifier 10 is fed via a resistor 52 to the base of a transistor 48 that has a relay 49 connected in its collector circuit. It is arranged that the output of the differential amplifier 10 goes high when the first conductivity probe 45 has a much lower conductivity than the second conductivity probe 46; in this condition the contacts 50 of relay 49 close to operate a device 51 (such as a runway heating system or a chemical spraying system) for reducing the probability of ice formation.

The circuit of FIG. 2 can be modified to operate as a simple form of apparatus according to the second aspect of the invention by interchanging the outputs of the differential amplifiers 10 and 11 so that the output of the amplifier 10 is connected to the resistor 39 and the output of the amplifier 11 is connected to the resistor 52. The output of the amplifier 10 will need inverting in order to control the refrigerator to maintain the conductivity probe 45 at freezing temperature. This inversion may be achieved by interchanging the complementary inputs to the amplifier 10. Such a modified circuit will keep the probe 45 at the freezing temperature of the solution and give a warning when the temperature sensitive circuit 34 is less than 2° warmer than the temperature sensitive circuit 35.

In alternative embodiments of the invention a solid-state refrigerator may replace the conventional refrigerator and heat exchanger system described which uses a fluid refrigerant.

I claim:

1. Apparatus for providing an indication of the imminence of ice-formation, including:
    first and second conductivity probes,
    a first differential amplifier having complementary inputs connected respectively to said first and said second conductivity probes,
    first and second temperature sensitive circuits,
    a second differential amplifier having complementary inputs connected respectively to said first and said second temperature sensitive circuits, and
    refrigeration means arranged for cooling said first conductivity probe and said first temperature sensitive circuit,
    said refrigeration means being connected to the output of one of said differential amplifiers to be controlled by said output and to cool said first conductivity probe and said first temperature sensitive circuit,
    the output of the other differential amplifier providing the said indication of imminence of ice-formation.

2. Apparatus for providing an indication of the imminence of ice-formation, including:
    first and second conductivity probes,
    a first differential amplifier having complementary inputs connected respectively to said first and said second conductivity probes,
    first and second temperature sensitive circuit,
    a second differential amplifier having complementary inputs connected respectively to said first and said second temperature sensitive circuits, and
    refrigeration means arranged for cooling said first conductivity probe and said first temperature sensitive circuit,
    said refrigeration means connected to the output of said second differential amplifier to be controlled by said output of said second differential amplifier and to maintain said first conductivity probe and said first temperature sensitive circuit at a predetermined temperature below the temperature of said second temperature sensitive circuit,
    the output of said first differential amplifier providing the said indication of imminence of ice-formation.

3. Apparatus according to claim 2 including temperature sensitive means arranged to render the apparatus inoperative when ambient temperature is above a predetermined value.

4. Apparatus according to claim 3 wherein said temperature sensitive means includes said second temperature sensitive circuit and a reference potential respectively connected to complementary inputs of a third differential amplifier, means to gate the output of said third differential amplifier with the output of said second differential amplifier to turn said refrigerator on only when said ambient temperature is below said predetermined value.

5. Apparatus according to claim 2 wherein said output of said first differential amplifier is connected to means for reducing the probability of ice-formation.

6. Apparatus for providing an indication of the imminence of ice-formation, including:
    first and second conductivity probes,
    a first differential amplifier having complementary inputs connected respectively to said first and said second conductivity probes,
    first and second temperature sensitive circuits,
    a second differential amplifier having complementary inputs connected respectively to said first and said second temperature sensitive circuits, and
    refrigeration means arranged for cooling said first conductivity probe and said first temperature sensitive circuit,
    said refrigeration means being connected to the output of said first differential amplifier to be controlled by said output of said first differential amplifier and to maintain said first conductivity probe and said first temperature sensitive circuit at the freezing point of a solution in which they may be immersed,
    said output of said second differential amplifier providing said indication of the imminence of ice-formation.

7. Apparatus according to claim 6 wherein the output of said second differential amplifier provides an indication of the number of degrees between said first and said second temperature sensitive probes.

8. Apparatus according to claim 6 including temperature sensitive means arranged to render the apparatus inoperative when ambient temperature is above a predetermined value.

9. Apparatus according to claim 8 wherein said temperature sensitive means includes said second temperature sensitive circuit and a reference potential respectively connected to complementary inputs of a third differential amplifier, means to gate the output of said third differential amplifier with the output of said first differential amplifier to turn said refrigerator on only when said ambient temperature is below said predetermined value.

10. Apparatus according to claim 6 wherein said output of said second differential amplifier is connected to means for reducing the probability of ice-formation.

* * * * *